US011064258B2

(12) United States Patent
Iwaki

(10) Patent No.: US 11,064,258 B2
(45) Date of Patent: Jul. 13, 2021

(54) REACTION SELECTION DEVICE, REACTION SELECTION METHOD, AND REACTION SELECTION PROGRAM

(71) Applicant: DWANGO Co., Ltd., Tokyo (JP)

(72) Inventor: Shinnosuke Iwaki, Tokyo (JP)

(73) Assignee: DWANGO Co., Ltd., Tokyo (JP)

( * ) Notice: Subject to any disclaimer, the term of this patent is extended or adjusted under 35 U.S.C. 154(b) by 0 days.

(21) Appl. No.: 16/495,129

(22) PCT Filed: Mar. 9, 2018

(86) PCT No.: PCT/JP2018/009211
§ 371 (c)(1),
(2) Date: Sep. 18, 2019

(87) PCT Pub. No.: WO2018/173804
PCT Pub. Date: Sep. 27, 2018

(65) Prior Publication Data
US 2020/0014982 A1 Jan. 9, 2020

(30) Foreign Application Priority Data
Mar. 21, 2017 (JP) .............................. JP2017-054117

(51) Int. Cl.
*H04N 21/25* (2011.01)
*H04N 21/431* (2011.01)
(Continued)

(52) U.S. Cl.
CPC ... *H04N 21/4788* (2013.01); *H04N 21/42206* (2013.01); *H04N 21/433* (2013.01)

(58) Field of Classification Search
None
See application file for complete search history.

(56) References Cited

U.S. PATENT DOCUMENTS

2010/0100904 A1* 4/2010 Kawakami ......... H04N 21/8133
725/37
2012/0151346 A1* 6/2012 McClements, IV ....................
G06Q 10/101
715/716
(Continued)

FOREIGN PATENT DOCUMENTS

CN 1839387 A 9/2006
CN 104199885 A 12/2014
(Continued)

OTHER PUBLICATIONS

Translation of International Search Report and Written Opinion dated Apr. 10, 2018 in corresponding application No. PCT/JP2018/009211; 6 pgs.
(Continued)

*Primary Examiner* — Brian T Pendleton
*Assistant Examiner* — Jean D Saint Cyr
(74) *Attorney, Agent, or Firm* — Maier & Maier, PLLC

(57) ABSTRACT

A reaction candidate storage unit stores candidates of reactions that are switched at predetermined time intervals. A reaction candidate update control unit updates the reaction candidates stored in the reaction candidate storage unit so that a candidate of a new reaction is stored and a reaction candidate already stored is erased after a predetermined time. A reaction candidate display control unit implements control to cause a reaction candidate stored in the reaction candidate storage unit to be displayed on a display unit. A reaction posting control unit, when one of reaction candidates being displayed on the display unit is selected and instructed to be posted, implements control to post the selected reaction candidate stored in the reaction candidate storage unit.

6 Claims, 8 Drawing Sheets

(51) Int. Cl.
*H04N 21/262* (2011.01)
*H04N 21/442* (2011.01)
*H04N 21/4788* (2011.01)
*H04N 21/433* (2011.01)
*H04N 21/422* (2011.01)

(56) References Cited

U.S. PATENT DOCUMENTS

| | | | | |
|---|---|---|---|---|
| 2014/0032500 A1* | 1/2014 | Wibbeler | ................ | G06F 16/93 |
| | | | | 707/661 |
| 2014/0096007 A1* | 4/2014 | Itoh | ......................... | G06F 16/50 |
| | | | | 715/732 |
| 2017/0223422 A1* | 8/2017 | Maruyama | ......... | H04N 21/8456 |
| 2018/0249215 A1* | 8/2018 | Wilkinson | ....... | H04N 21/44222 |
| 2018/0310076 A1* | 10/2018 | Roberts | ............ | H04N 21/44012 |

FOREIGN PATENT DOCUMENTS

| | | | |
|---|---|---|---|
| CN | 105898619 | A | 8/2016 |
| JP | 2005-165941 | A | 6/2005 |
| JP | 2013-229873 | A | 11/2013 |
| JP | 2015-115892 | A | 6/2015 |
| JP | 2015-211290 | A | 11/2015 |

OTHER PUBLICATIONS

Chinese Office Action dated Oct. 10, 2020 in corresponding Chinese Application No. 201880013296.7; 10 pages.

* cited by examiner

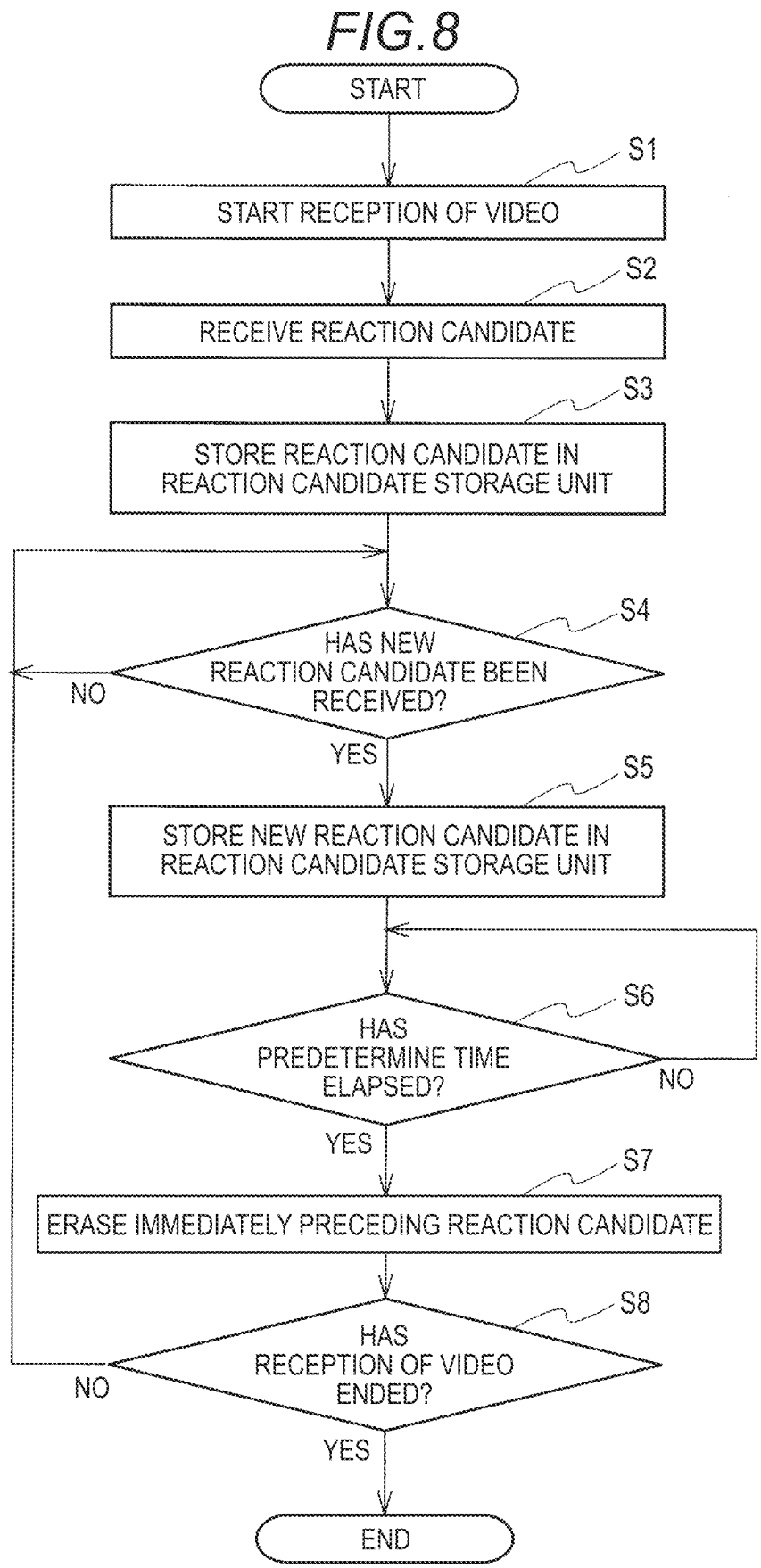

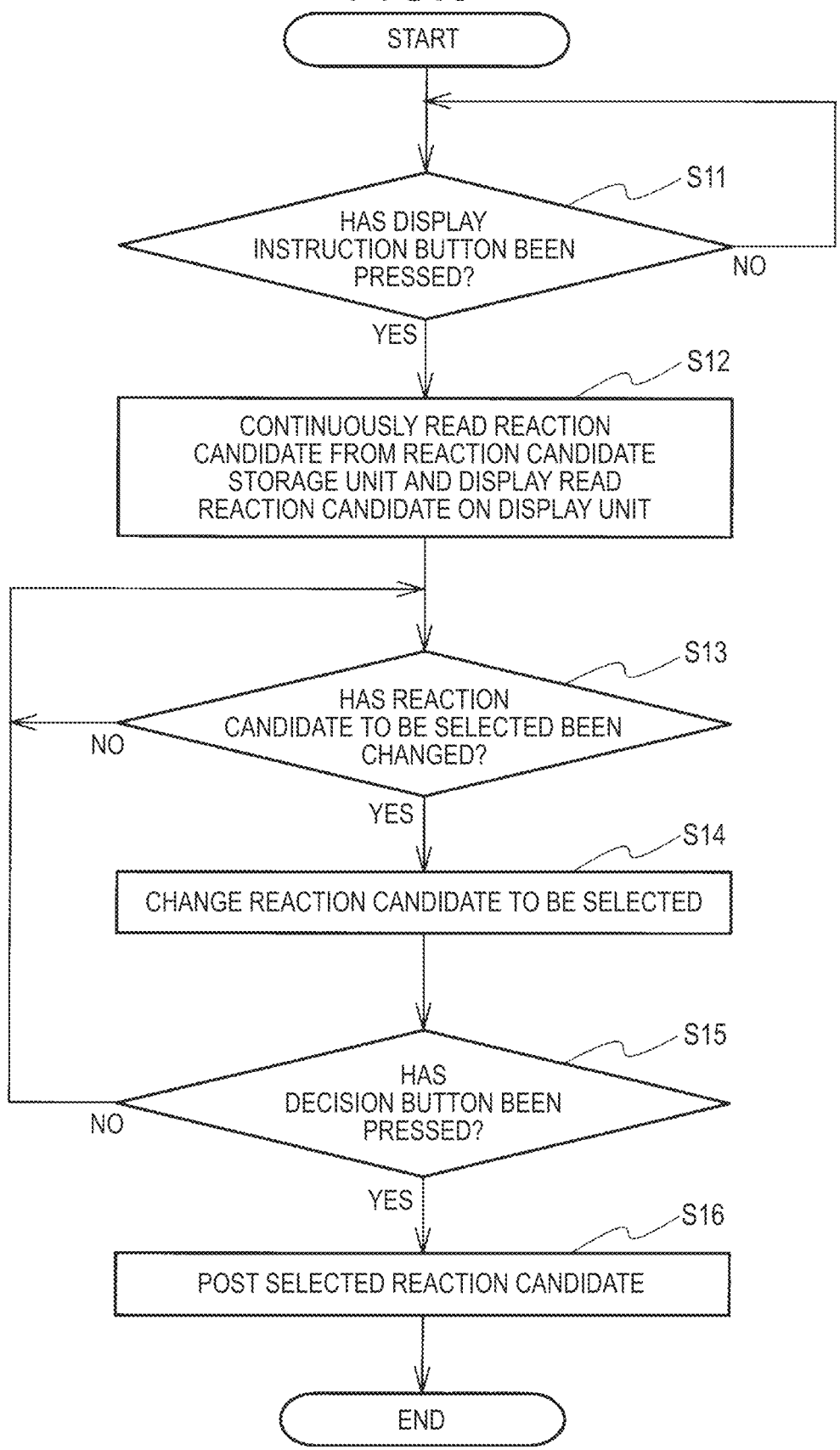

REACTION SELECTION DEVICE, REACTION SELECTION METHOD, AND REACTION SELECTION PROGRAM

FIELD

The present disclosure relates to a reaction selection device, a reaction selection method, and a reaction selection program for selecting a reaction such as a comment on a video.

BACKGROUND

There has been a supply of a video providing service for streaming videos to various image display devices such as a personal computer, a tablet terminal, a portable terminal such as a smartphone, a television receiver, a game machine, etc. The video providing service provides a service that allows a video viewer to post a comment such as an impression of a video as an example of a reaction to a video being viewed.

The video providing service distributes a video and comments posted by a plurality of viewers to an image display device owned by the viewer. The image display device superimposes and displays the comments on the distributed video. The viewer can enjoy the comments while watching the video.

Patent Document 1: JP-A-2013-229873

SUMMARY

Since each of the personal computer, the tablet terminal, and the smartphone has a keyboard (including a software keyboard, the same is applied hereinafter), it is relatively easy for a viewer to input and post comment text. It is difficult to input and post comment text using an image display device only including a remote controller and not including a keyboard such as a television receiver or a game machine.

Therefore, Patent Document 1 describes a terminal device capable of easily posting a comment simply by presenting options for a comment candidate to the viewer and selecting a presented comment. Patent Document 1 describes that candidates for a comment according to an elapsed time from a start of playback are presented so that a comment corresponding to content of a video being played back can be selected.

However, when candidates for a comment that can be selected by the viewer are switched at predetermined time intervals as the video progresses, switching to a subsequent comment candidate may occur at timing at which the posted comment candidates are viewed and one of the comments is attempted to be selected and posted. When the subsequent comment candidate does not include the selected comment to be posted, the viewer may not post the comment.

An object of an embodiment is to provide a reaction selection device, a reaction selection method, and a reaction selection program capable of selecting a reaction candidate immediately before switching even immediately after a reaction candidate is switched to a subsequent reaction candidate when reaction candidates selectable by a viewer are switched at predetermined time intervals as a video progresses.

According to a first aspect of the embodiment, there is provided a reaction selection device characterized by including a reaction candidate storage unit that stores a reaction candidate for posting on a video switched at predetermined time intervals as the video progresses, a reaction candidate update control unit that implements control to update a reaction candidate stored in the reaction candidate storage unit such that when a reaction candidate previously stored in the reaction candidate storage unit is switched to a new reaction candidate, the new reaction candidate is stored in the reaction candidate storage unit and the previously stored reaction candidate is erased after a predetermined time has elapsed from a time point at which the previously stored reaction candidate is switched to the new reaction candidate, a reaction candidate display control unit that implements control to display a reaction candidate stored in the reaction candidate storage unit on a display unit, and a reaction posting control unit that implements control such that when any one of reaction candidates displayed on the display unit is selected and it is instructed that the selected reaction candidate be posted, the selected reaction candidate stored in the reaction candidate storage unit is posted.

According to a second aspect of the embodiment, there is provided a reaction selection method characterized by including storing, by a reaction candidate storage unit, a reaction candidate for posting on a video switched at predetermined time intervals as the video progresses, implementing, by a reaction candidate update control unit, control to update a reaction candidate stored in the reaction candidate storage unit such that when a reaction candidate previously stored in the reaction candidate storage unit is switched to a new reaction candidate, the new reaction candidate is stored in the reaction candidate storage unit and the previously stored reaction candidate is erased after a predetermined time has elapsed from a time point at which the previously stored reaction candidate is switched to the new reaction candidate, implementing, by a reaction candidate display control unit, control to display a reaction candidate stored in the reaction candidate storage unit on a display unit, and implementing, by a reaction posting control unit, control such that when any one of reaction candidates displayed on the display unit is selected and it is instructed that the selected reaction candidate be posted, the selected reaction candidate stored in the reaction candidate storage unit is posted.

According to a third aspect of the embodiment, there is provided a reaction selection program characterized by causing a computer to execute a step of storing a reaction candidate for posting on a video switched at predetermined time intervals as the video progresses in a storage unit, a step of updating a reaction candidate stored in the storage unit such that when a reaction candidate previously stored in the storage unit is switched to a new reaction candidate, the new reaction candidate is stored in the storage unit and the previously stored reaction candidate is erased after a predetermined time has elapsed from a time point at which the previously stored reaction candidate is switched to the new reaction candidate, a step of displaying a reaction candidate stored in the storage unit on a display unit, and a step of posting, when any one of reaction candidates displayed on the display unit is selected and it is instructed that the selected reaction candidate be posted, the selected reaction candidate stored in the storage unit.

According to the reaction selection device, the reaction selection method, and the reaction selection program of the embodiment, it is possible to select a reaction candidate before switching even immediately after a reaction candidate is switched to a subsequent reaction candidate when reaction candidates selectable by a viewer are switched at predetermined time intervals as a video progresses.

BRIEF DESCRIPTION OF THE DRAWINGS

FIG. 8 is a flowchart mainly illustrating a process of updating a reaction candidate among processes executed by a reaction selection program according to an embodiment.

FIG. 9 is a flowchart illustrating a process of displaying reaction candidates on the display unit and selecting and posting one of the reaction candidates among the processes executed by the reaction selection program according to the embodiment.

DETAILED DESCRIPTION

Hereinafter, a reaction selection device, a reaction selection method, and a reaction selection program according to an embodiment will be described with reference to accompanying drawings.

Figure 1:
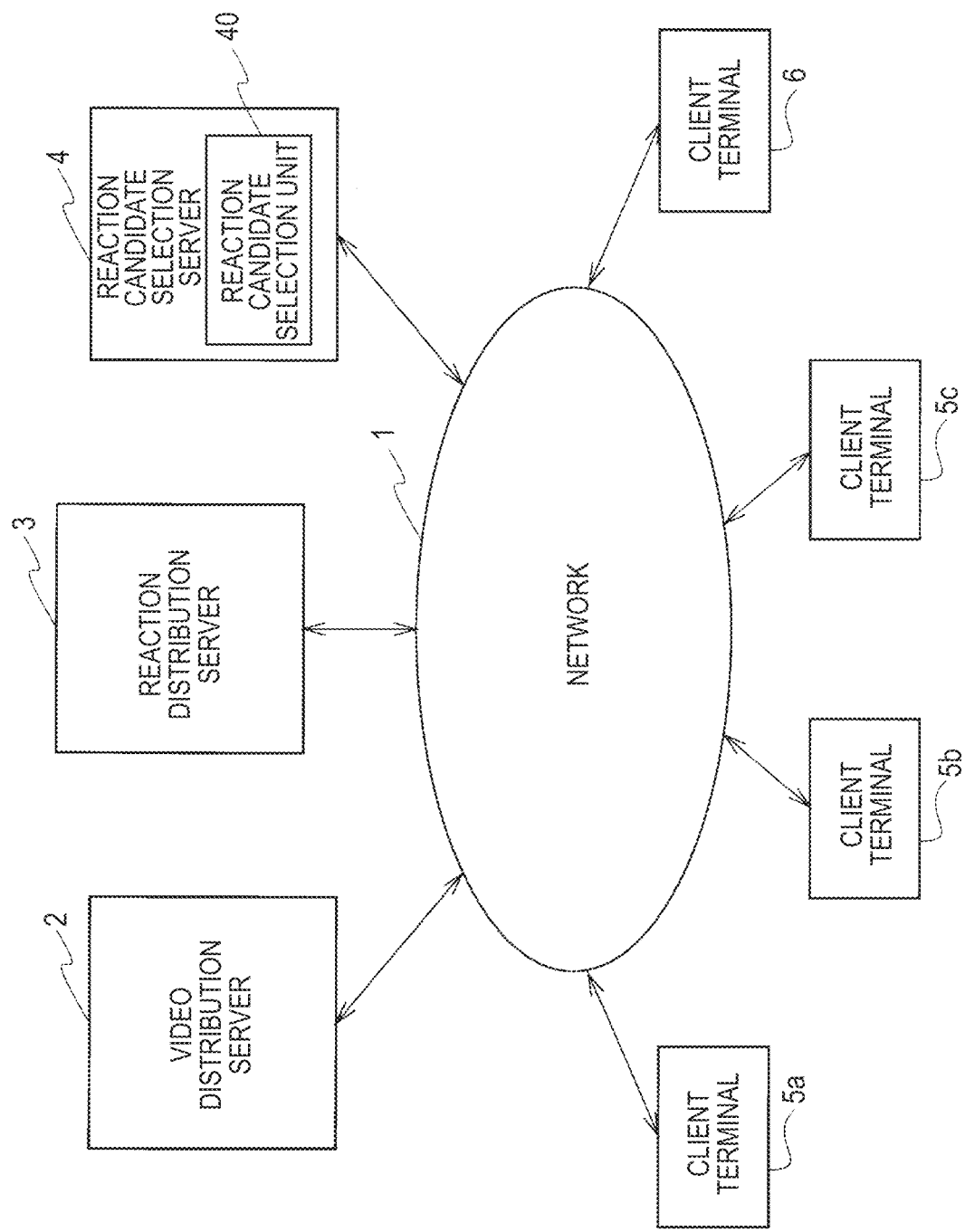
FIG. 1 is a block diagram illustrating a system configuration example of a video providing service.

First, an example of an overall system configuration of a video providing service will be described with reference to FIG. 1. In FIG. 1, a video distribution server 2, a reaction distribution server 3, and a reaction candidate selection server 4 are connected to a network 1. The reaction candidate selection server 4 includes a reaction candidate selection unit 40. The network 1 is the Internet or any other network.

Further, client terminals 5a to 5c and 6 are connected to the network 1. It is presumed that each of the client terminals 5a to 5c is a client terminal including a keyboard, such as a personal computer, a tablet terminal, and a smartphone. It is presumed that the client terminal 6 is a client terminal not including a keyboard, such as a television receiver or a game machine. Here, the total number of client terminals is four. However, in practice, more client terminals are present, and the number of client terminals is arbitrary.

The video distribution server 2 distributes a video to the client terminals 5a to 5c and 6 via the network 1. The video may correspond to a video created in advance and recorded, or correspond to a live broadcast video. Each of the client terminals 5a to 5c and 6 receives the video and displays the video on a display unit included therein. Each of viewers owning the client terminals 5a to 5c posts a comment, which is a character string such as an impression of the video, as an example of a reaction to the video being viewed. The client terminal 6 posts a comment as described later.

The reaction is not limited to comments. The reaction may correspond to a mark that conceptually indicates the impression of the video. The reaction may correspond to URL information or voice information.

The comment posted by each of the client terminals 5a to 5c and 6 is transmitted to the reaction distribution server 3 with an ID of the video, a time when the comment is posted, a user ID of the viewer, and a display method (display position etc.) of the comment associated with the character string of the comment. In the case of a video being recorded, a playback time from a playback start time of the video indicating a timing at which the comment is displayed is further associated with the character string of the comment.

The reaction distribution server 3 adds at least the display method of the comment (the playback time in addition to the display method in the case of the recorded video) to the comment associated with the ID of the video, and distributes the comment to the client terminals 5a to 5c and 6.

The reaction candidate selection unit 40 of the reaction candidate selection server 4 selects a reaction (comment) candidate as described later, and the reaction candidate selection server 4 distributes the reaction candidate to the client terminals 5a to 5c and 6.

Figure 2:
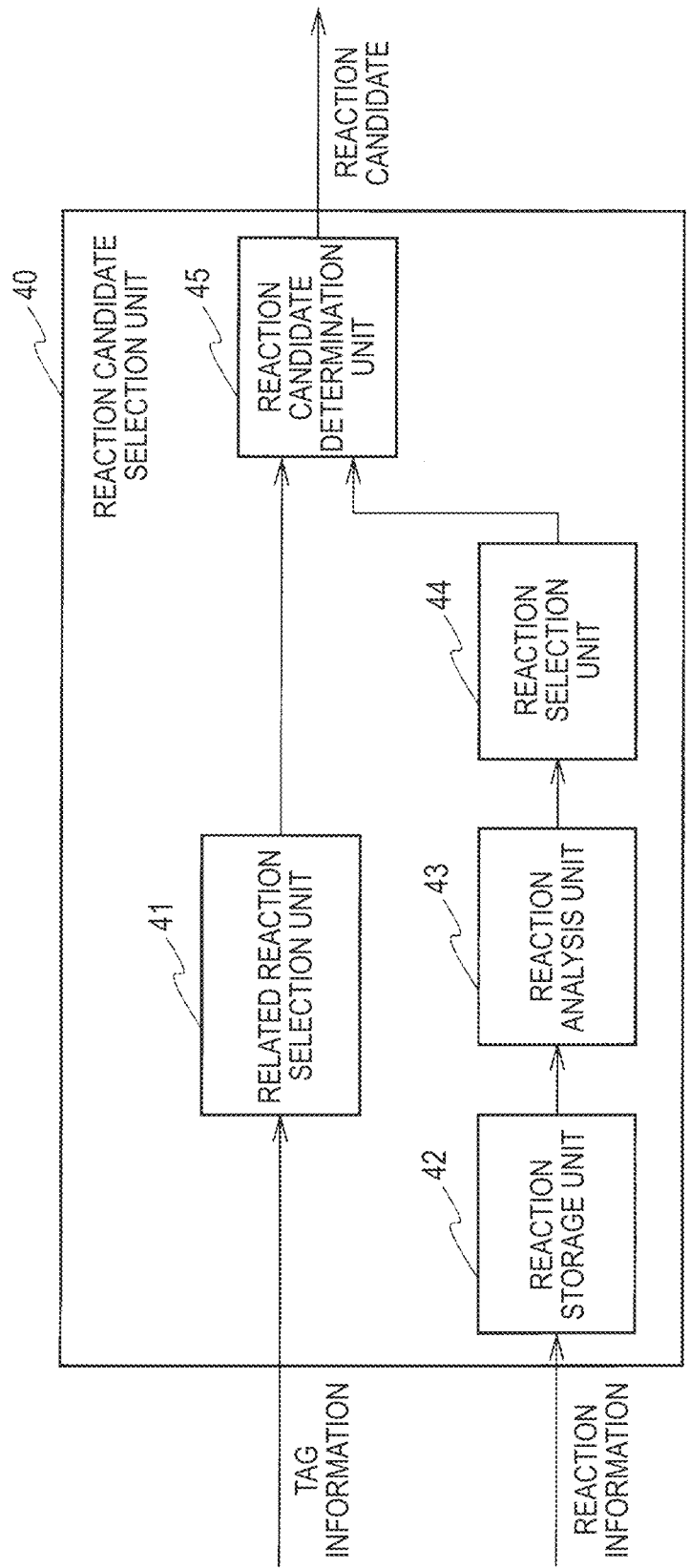
FIG. 2 is a block diagram illustrating a configuration example of a reaction candidate selection unit included in a reaction candidate selection server of FIG. 1.

A configuration example of the reaction candidate selection unit 40 will be described with reference to FIG. 2. The recorded video is associated with tag information for searching for the video. The related reaction selection unit 41 selects a related reaction related to the content of the video based on the tag information of the video. The related reaction selection unit 41 holds a plurality of reactions in advance, and may select the related reaction related to the content of the video based on the input tag information. The related reaction selected by the related reaction selection unit 41 is supplied to the reaction candidate determination unit 45.

Reaction information distributed by the reaction distribution server 3 is input to the reaction storage unit 42. The reaction storage unit 42 temporarily stores successively input reaction information, and updates the stored reaction information after a predetermined time has elapsed. The reaction analysis unit 43 analyzes the reaction information stored in the reaction storage unit 42, and obtains, for example, a frequency of appearance of the reaction. The reaction selection unit 44 selects, for example, a predetermined number of reactions in descending order of frequency, and supplies the selected reactions to the reaction candidate determination unit 45.

Parts from the reaction storage unit 42 to the reaction selection unit 44 are suitable configurations for selecting a reaction related to content of a live broadcast video. In many cases, tag information is not associated with a live broadcast video, and from the reaction storage unit 42 to the reaction selection unit 44 can select a candidate reaction based on an actually posted reaction.

The reaction candidate determination unit 45 finally determines a reaction candidate based on the related reaction supplied from the related reaction selection unit 41 and the reaction supplied from the reaction selection unit 44. The reaction candidate determination unit 45 may select the related reaction supplied from the related reaction selection unit 41 in the case of the recorded video and select the reaction supplied from the reaction selection unit 44 in the case of the live broadcast video.

Even in the case of the recorded video, the reaction candidate determination unit 45 may finally determine a reaction candidate based on both the related reaction supplied from the related reaction selection unit 41 and the reaction supplied from the reaction selection unit 44. A scheme of determining a reaction candidate by the reaction candidate selection unit 40 is arbitrary and is not limited to the above-described example.

Next, a configuration example of the client terminal 6 will be described using FIG. 3. The client terminal 6 is configured to be able to select and post a reaction based on the reaction candidate distributed by the reaction candidate selection server 4.

A communication unit 61 receives the video distributed from the video distribution server 2. The video playback control unit 62 includes a memory for buffering the received video for a predetermined time, and implements control to display the video on a display unit 64. The display unit 64 is, for example, a liquid crystal panel. The communication unit 61 receives the reaction distributed from the reaction distribution server 3. The reaction display control unit 63 implements control to superimpose and display the received reaction on the video displayed on the display unit 64.

The communication unit 61 receives the reaction candidate distributed from the reaction candidate selection server 4 and supplies the reaction candidate storage unit 65 with the reaction candidate. The reaction candidate storage unit 65 may include, for example, a random access memory (RAM), and stores the input reaction candidate. Each time a new reaction candidate is received, the communication unit 61 notifies the reaction candidate update control unit 66 that the reaction candidate has been switched. The reaction candidate update control unit 66 updates the reaction candidate stored in the reaction candidate storage unit 65 as described later.

The operating unit 67 is an operation button provided on a casing of the client terminal 6 or a remote controller separate from the casing. When an instruction to display the reaction candidate on the display unit 64 is given by the operating unit 67, the reaction candidate display control unit reads the reaction candidate stored in the reaction candidate storage unit 65 and displays the reaction candidate on the display unit 64.

When an instruction to select and post any of reaction candidates displayed on the display unit 64 is given by the operating unit 67, the reaction posting control unit 69 implements control to read the selected reaction candidate from the reaction candidate storage unit 65 and post the read reaction candidate via the communication unit 61.

At least the reaction candidate storage unit 65, the reaction candidate update control unit 66, the reaction candidate display control unit 68, and the reaction posting control unit 69 are included in the reaction selection device of the present embodiment.

A description will be given of a way of an operation of the reaction selection device of the present embodiment and a procedure executed by the reaction selection method of the present embodiment when reaction candidates are switched at predetermined time intervals as the video progresses with reference to FIG. 4.

Figure 4:
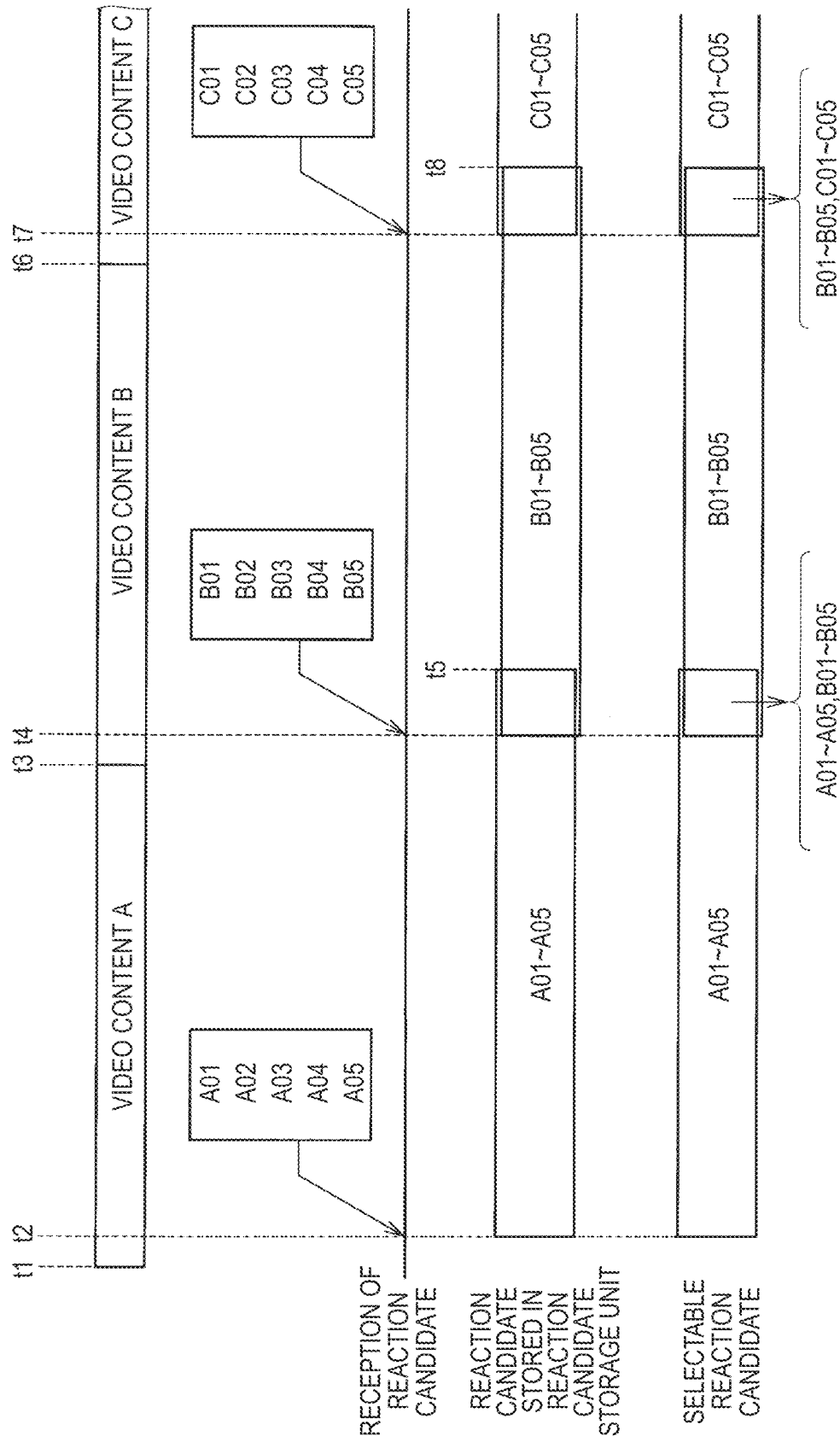
FIG. 4 is a diagram for description of a reaction selection device, a reaction selection method, and a reaction selection program of an embodiment.

In FIG. 4, it is presumed that a video starts to be distributed at a time t1 corresponds to video content A until a time t3, corresponds to video content B from the time t3 to a time t6, and corresponds to video content C from the time t6. The video contents A to C may correspond to separate substances having completely different video contents, or correspond to a video of one substance in which content of the video differs depending on the development of a story.

Here, when it is presumed that a live broadcast video is being distributed, the reaction candidate selection server 4 determines a reaction candidate during a predetermined time from the time t1 to the time t2 and distributes the determined reaction candidate to the client terminal 6. At the time t2, the communication unit 61 receives reaction candidates A01 to A05. Even though the number of reaction candidates is set to five, the number is not limited. The reaction candidate storage unit 65 stores the received reaction candidates A01 to A05.

In response to switching to the video content B at the time t3, similarly, the reaction candidate selection server 4 determines a reaction candidate during a predetermined time from the time t3 to the time t4 and distributes the determined reaction candidate to the client terminal 6. At the time t4, the communication unit 61 receives reaction candidates B01 to B05. The reaction candidate storage unit 65 stores the received reaction candidates B01 to B05.

Even when the new reaction candidates B01 to B05 are received at the time t4, the reaction candidate update control unit 66 does not erase the reaction candidates A01 to A05 previously stored in the reaction candidate storage unit 65 at the time t4 and erases the reaction candidates A01 to A05 at a time t5 after a predetermined time has elapsed. That is, in a period from the time t4 to the time t5, the reaction candidates A01 to A05 and B01 to B05 are stored in the reaction candidate storage unit 65.

Further, in response to switching to the video content C at a time t6, similarly, the reaction candidate selection server 4 determines a reaction candidate during a predetermined time from the time t6 to a time t7 and distributes the determined reaction candidate to the client terminal 6. At the time t7, the communication unit 61 receives reaction candidates C01 to C05. The reaction candidate storage unit 65 stores the received reaction candidates C01 to C05.

Even when the new reaction candidates C01 to C05 are received at the time t7, the reaction candidate update control unit 66 does not erase the reaction candidates B01 to B05 previously stored in the reaction candidate storage unit 65 at the time t7 and erases the reaction candidates B01 to B05 at a time t8 after a predetermined time has elapsed. That is, in a period from the time t7 to the time t8, the reaction candidates B01 to B05 and C01 to C05 are stored in the reaction candidate storage unit 65.

A predetermined time corresponding to the period from the time t4 to the time t5 and the period from the time t7 to the time t8 may correspond to 1 to 3 seconds.

The reaction candidate update control unit 66 updates the reaction candidates stored in the reaction candidate storage unit 65 as described above. Therefore, the viewer can select one of the reaction candidates A01 to A05 at the time t2 to t4, and select one of the reaction candidates A01 to A05 and B01 to B05 at the time t4 to t5.

In addition, the viewer can select one of the reaction candidates B01 to B05 at the time t5 to t7, and select one of the reaction candidates B01 to B05 and C01 to C05 at the time t7 to t8.

In FIG. 4, the reaction candidates for the video contents A to C are all different. However, the reaction candidates may partially overlap. In the recorded video, reaction candidates may be determined in advance for the respective video contents A to C. Reaction candidates may be determined at predetermined time intervals as the video progresses using a scheme described in Patent Document 1.

Figure 5:
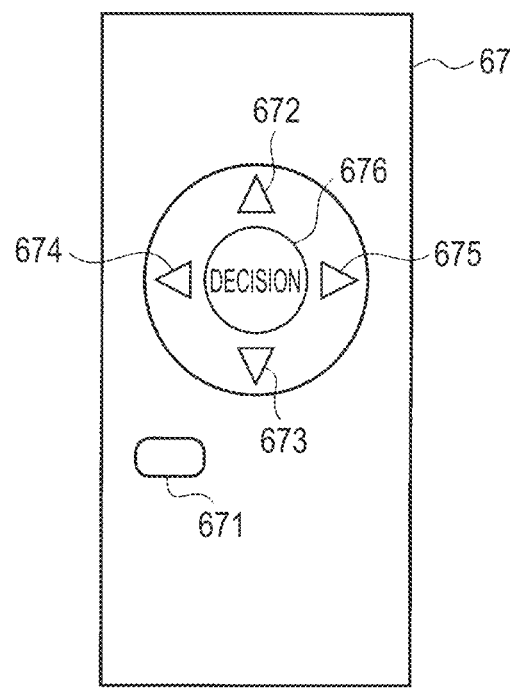
FIG. 5 is a plan view illustrating an example of an operating unit of the client terminal.

The operating unit 67 is a remote controller as an example and configured such that the reaction candidate display control unit 68 displays the reaction candidate stored in the reaction candidate storage unit 65 on the display unit 64 when a display instruction button 671 illustrated in FIG. 5 is pressed. The operating unit 67 may correspond to a touch panel.

Figure 6:
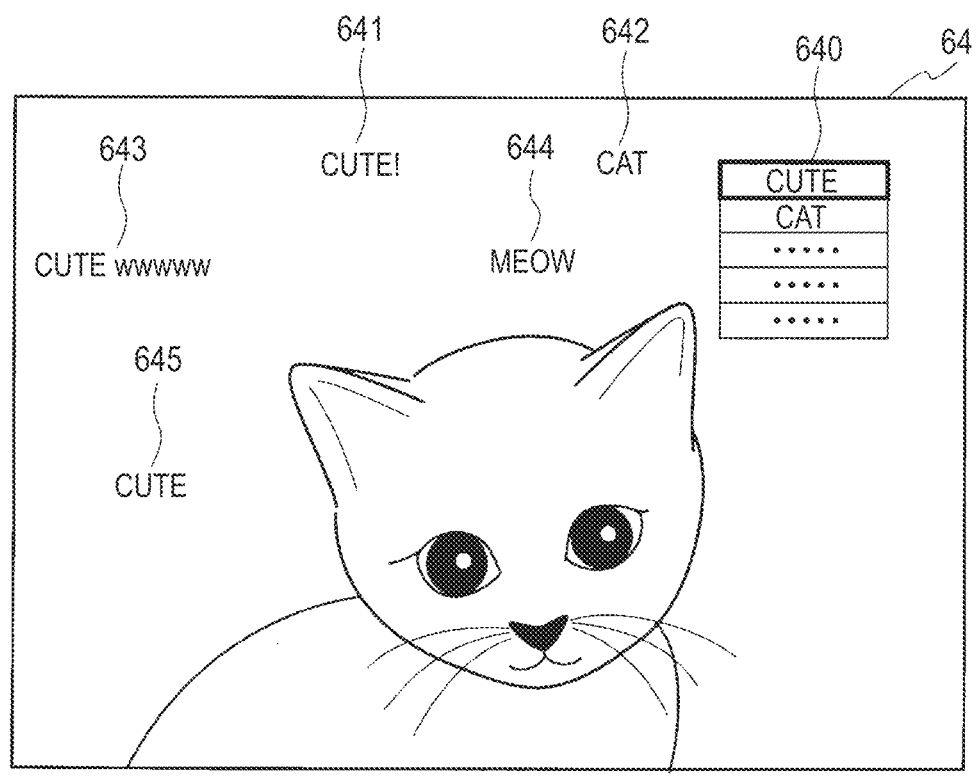
FIG. 6 is a diagram illustrating an example of a video and comment candidates displayed on a display unit of the client terminal.

When the viewer presses the display instruction button 671, the reaction candidate display control unit 68 reads reaction candidates from the reaction candidate storage unit 65, and causes the display unit 64 to display a reaction candidate list 640 as illustrated in FIG. 6. When the display instruction button 671 is pressed and the candidate list 640 is displayed on the display unit 64, the reaction candidate display control unit 68 repeats an operation of continuously reading reaction candidates from the reaction candidate storage unit 65 and displaying the candidate list 640.

In FIG. 6, comments 641 to 645 are displayed in the video under the control of the reaction display control unit 63. For example, FIG. 6 illustrates a case in which the display instruction button 671 is pressed at the time t2 to t4 in FIG. 5.

The viewer can select any reaction candidate from the candidate list 640 by pressing an upward cursor key 672 or a downward cursor key 673. A reaction candidate surrounded by a thick line is in a state of being selected. When the candidate list 640 is displayed, a top candidate is selected. When the viewer presses a decision button 676, the reaction posting control unit 69 reads the selected reaction candidate from the reaction candidate storage unit 65, and implements control to post the read reaction candidate via the communication unit 61.

It is presumed that a timing at which the viewer selects a reaction candidate and attempts to press the decision button 676 is immediately before the time t4 in FIG. 4, and it is past the time t4 before the decision button 676 is pressed. In a conventional art described in Patent Document 1, when it is past the time t4, an immediately preceding reaction candidate stored until the time t4 is erased, and it is impossible to post a reaction to be posed in FIG. 6.

Figure 7:
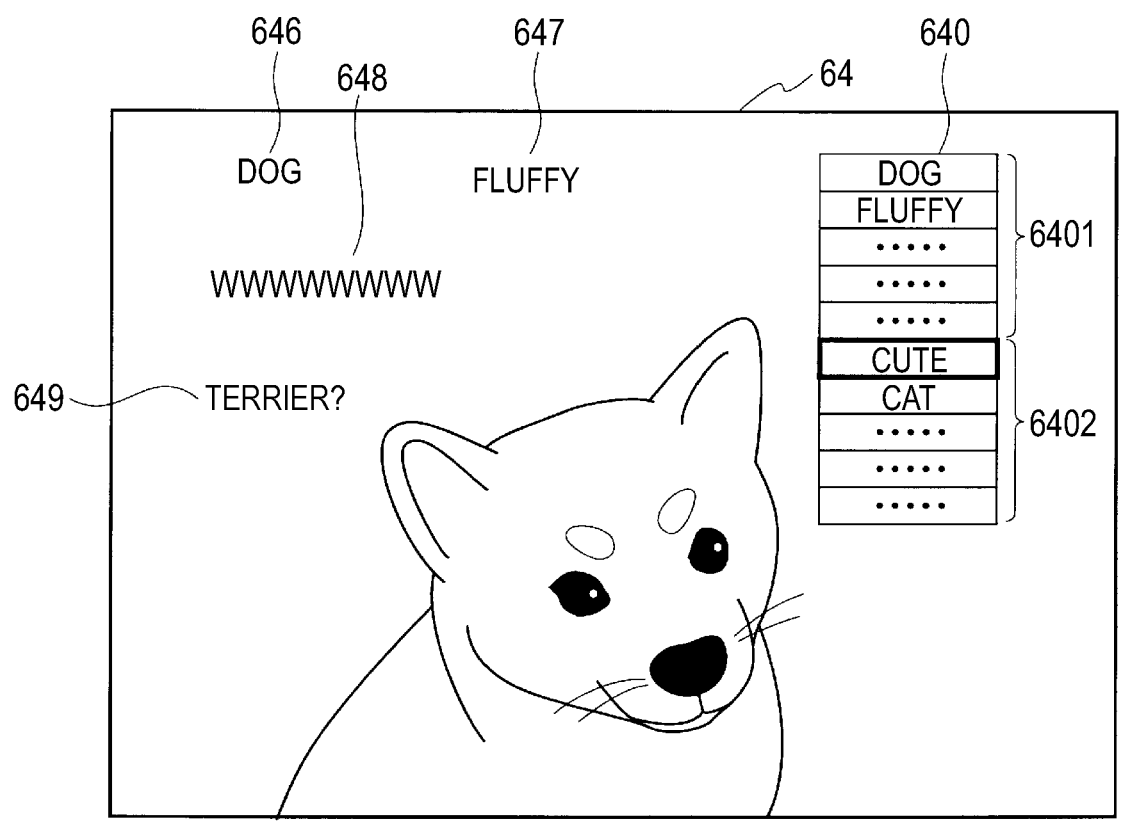
FIG. 7 is a diagram illustrating an example of a video and comment candidates displayed on the display unit of the client terminal immediately after content of the video is switched.

FIG. 7 illustrates the candidate list 640 displayed on the display unit 64 immediately after the time t4 has past. As described above, the reaction candidate display control unit 68 repeats the operation of continuously reading reaction candidates from the reaction candidate storage unit 65 and displaying the candidate list 640. Therefore, as illustrated in FIG. 7, a candidate list 640 including a candidate list 6401 selectable after the time t4 and a candidate list 6402 selectable before the time t4 are displayed on the display unit 64.

The viewer can select and post any reaction candidate from the immediately previous candidate list 6402 during the predetermined time even when it is past the time t4. When the candidate list 640 shifts from FIG. 6 to FIG. 7, it is preferable that the reaction candidate selected in FIG. 6 is continuously selected in FIG. 7.

The reaction candidate display control unit 68 may cancel the display of the candidate list 640 when the viewer presses the decision button 676 and posting of the reaction is completed, or cancel the display of the candidate list 640 when a display cancel button (not illustrated) is pressed.

In examples illustrated in FIG. 6 and FIG. 7, the candidate list 640 is superimposed on the video. However, the candidate list 640 may be displayed in another window so as not to overlap with the video. In the examples illustrated in FIG. 6 and FIG. 7, the reaction candidates are vertically arranged to form the candidate list 640. However, a scheme of arranging the candidates is arbitrary.

In addition, instead of listing all the candidates as the candidate list 640, at least one candidate may be displayed and the displayed candidate may be transmitted in order using the cursor key 672 or 673, a left cursor key 674, or a right cursor key 675.

Figure 3:
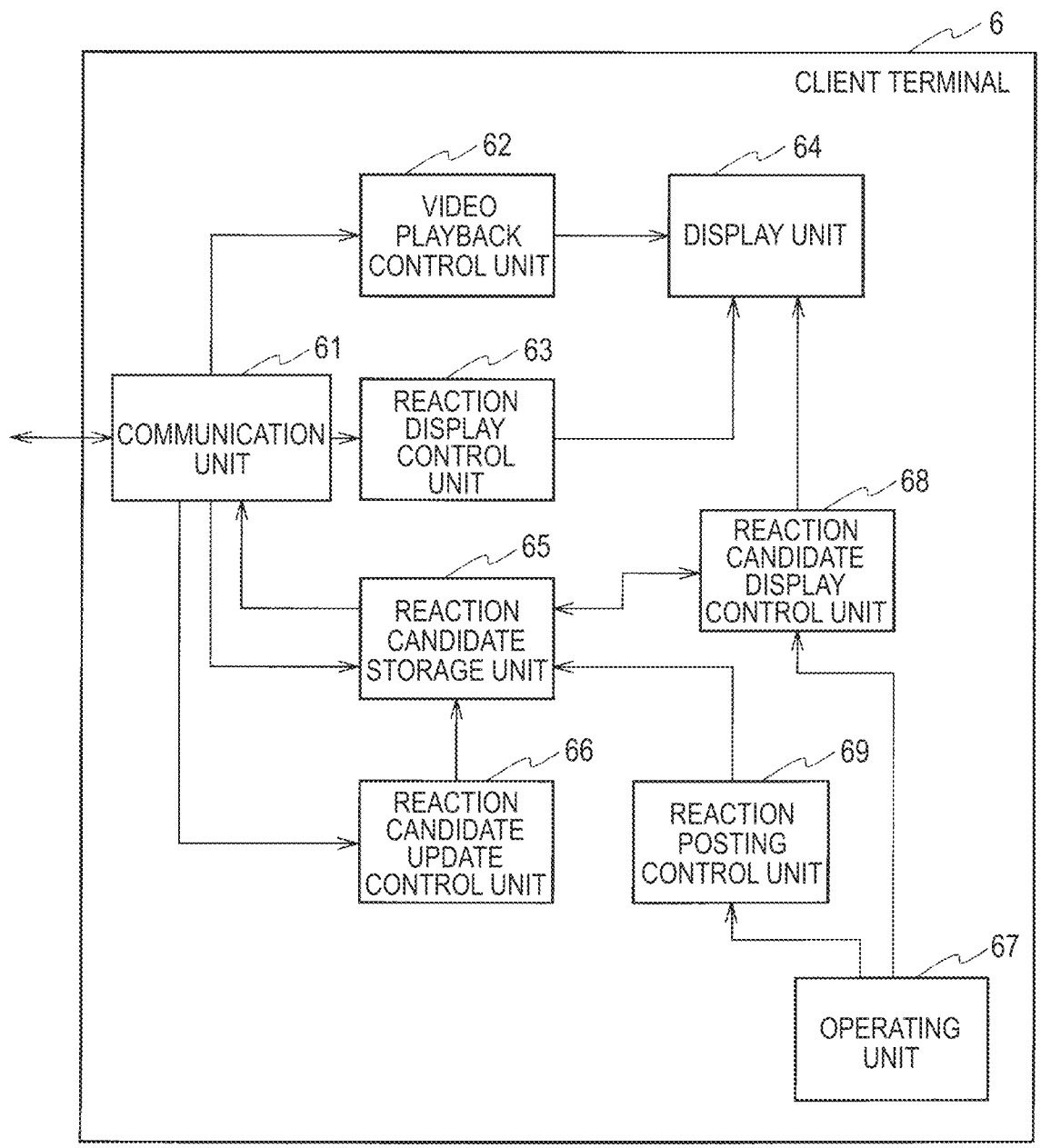
FIG. 3 is a block diagram illustrating a configuration example of a client terminal including a reaction selection device of an embodiment.

In FIG. 3, the video playback control unit 62, the reaction display control unit 63, the reaction candidate update control unit 66, the reaction candidate display control unit 68, and the reaction posting control unit 69 can be configured by a central processing unit (CPU) of a microcomputer. At least the reaction candidate update control unit 66, the reaction candidate display control unit 68, and the reaction posting control unit 69 can be configured by a computer program (a reaction selection program) executed by the microcomputer (CPU). The reaction selection program may be provided to the client terminal 6 via the network 1 or may be stored in a non-transitory storage medium and provided to the client terminal 6. Each part illustrated in FIG. 3 may be configured by hardware (circuit), and proper use of software and hardware is optional.

A flowchart illustrated in FIG. 8 mainly illustrates a process of updating a reaction candidate stored in the reaction candidate storage unit 65 corresponding to a control process by the reaction candidate update control unit 66 among processes executed by the reaction selection program according to the present embodiment.

The reaction selection program causes the CPU to execute processing of steps S1 to S8 illustrated in FIG. 8. The CPU starts to receive a video in step S1, and receives a reaction candidate in step S2. In step S3, the CPU causes the reaction candidate storage unit 65 to store the reaction candidate.

In step S4, the CPU determines whether a new reaction candidate has been received. When the new reaction candidate is not received (NO), the CPU repeats processing of step S4. When the new reaction candidate is received (YES), the CPU causes the reaction candidate storage unit 65 to store the new reaction candidate in step S5.

The CPU determines in step S6 whether a predetermined time has elapsed. When the predetermined time has not elapsed (NO), the CPU repeats processing of step S6. When the predetermined time has elapsed (YES), the CPU erases an immediately preceding reaction candidate stored in the reaction candidate storage unit 65 in step S7.

In step S8, the CPU determines whether reception of the video has ended. When reception of the video has not ended (NO), the CPU returns the processing to step S4. When reception of the video has ended (YES), the CPU ends the processing.

A flowchart illustrated in FIG. 9 illustrates a process of displaying reaction candidates on the display unit 64 and selecting and posting one of the reaction candidates corresponding to a control process by the reaction candidate display control unit 68 and the reaction posting control unit 69 among the processes executed by the reaction selection program according to the present embodiment.

The reaction selection program causes the CPU to execute processing of steps S11 to S16 illustrated in FIG. 9. In step S11, the CPU determines whether the display instruction button 671 has been pressed. When the display instruction button 671 has not been pressed (NO), the CPU repeats processing of step S11.

When the display instruction button 671 has been pressed (YES), the CPU continuously reads reaction candidates from the reaction candidate storage unit 65 and causes the display unit 64 to display the reaction candidates in step S12. In step S13, the CPU determines whether a reaction candidate to be selected has been changed by pressing the cursor key 672 or 673. When the reaction candidate to be selected has not been changed (NO), the CPU repeats processing of step S13.

When the reaction candidate to be selected has been changed (YES), the CPU changes the reaction candidate to be selected in step S14. In step S15, the CPU determines whether the decision button 676 has been pressed. When the decision button 676 has not been pressed (NO), the CPU returns the processing to step S13.

When the decision button 676 has been pressed (YES), the CPU posts the selected reaction candidate in step S16, and ends the processing.

According to the reaction selection device, the reaction selection method, and the reaction selection program of the present embodiment, even a client terminal not having a keyboard can easily select and post a reaction. Therefore, in the present embodiment, a configuration in which the reaction selection device of the present embodiment is mounted in the client terminal 6 not having a keyboard is given as an example.

However, even the client terminals 5a to 5c having the keyboard have an effect that it is possible to easily select and post a reaction by mounting the reaction selection device of the present embodiment. Regardless of client terminals, when the reaction selection program of the present embodiment is downloaded as an application program, it is possible to obtain a configuration equivalent to that of the reaction selection program of the present embodiment, and it is possible to execute the reaction selection method of the present embodiment.

In the present embodiment described above, a description has been given of an example in which reaction candidates are created outside the client terminals 5a to 5c and 6 so as to cope with a change in content of a video. However, the client terminals 5a to 5c and 6 may have the function of the reaction candidate selection unit 40 included in the reaction candidate selection server 4.

The disclosure of the present application is related to the subject matter described in Japanese Patent Application No. 2017-054117, filed on Mar. 21, 2017, the entire disclosure content of which is incorporated herein by reference.

It should be noted that various modifications and alterations may be made to the above embodiment without departing from the novel and advantageous features of the invention other than those previously described. Accordingly, all such modifications and alterations are intended to be included within the scope of the appended claims.

The invention claimed is:

1. A reaction selection method comprising:
storing, by a reaction candidate storage unit, a reaction candidate for posting on a video switched at predetermined time intervals as the video progresses;
implementing, by a reaction candidate update control unit, control to update a reaction candidate stored in the reaction candidate storage unit such that when a reaction candidate previously stored in the reaction candidate storage unit is switched to a new reaction candidate, the new reaction candidate is stored in the reaction candidate storage unit and the previously stored reaction candidate is erased after a predetermined time has elapsed from a time point at which the previously stored reaction candidate is switched to the new reaction candidate;
implementing, by a reaction candidate display control unit, control to display a reaction candidate stored in the reaction candidate storage unit on a display unit; and
implementing, by a reaction posting control unit, control such that when any one of reaction candidates displayed on the display unit is selected and it is instructed that the selected reaction candidate be posted, the selected reaction candidate stored in the reaction candidate storage unit is posted.

2. The reaction selection method according to claim 1, wherein a communication unit receives a reaction candidate created to cope with a change in content of the video via a network.

3. The reaction selection method according to claim 1, wherein the reaction is a comment superimposed and displayed on the video.

4. A non-transitory computer readable medium storing a reaction selection program causing a computer to execute:
a step of storing a reaction candidate for posting on a video switched at predetermined time intervals as the video progresses in a storage unit;
a step of updating a reaction candidate stored in the storage unit such that when a reaction candidate previously stored in the storage unit is switched to a new reaction candidate, the new reaction candidate is stored in the storage unit and the previously stored reaction candidate is erased after a predetermined time has elapsed from a time point at which the previously stored reaction candidate is switched to the new reaction candidate;
a step of displaying a reaction candidate stored in the storage unit on a display unit; and
a step of posting, when any one of reaction candidates displayed on the display unit is selected and it is instructed that the selected reaction candidate be posted, the selected reaction candidate stored in the storage unit.

5. The reaction selection program according to claim 4, causing the computer to further execute
a step of receiving a reaction candidate created to cope with a change in content of the video via a network.

6. The reaction selection program according to claim 4, wherein the reaction is a comment superimposed and displayed on the video.

* * * * *